Jan. 29, 1952     G. M. WALRAVEN ET AL     2,583,617
RATCHET CONTROL MECHANISM
Filed March 23, 1946
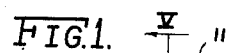
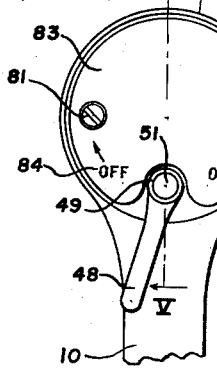
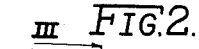
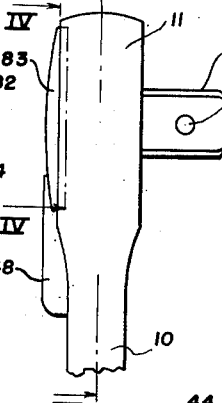
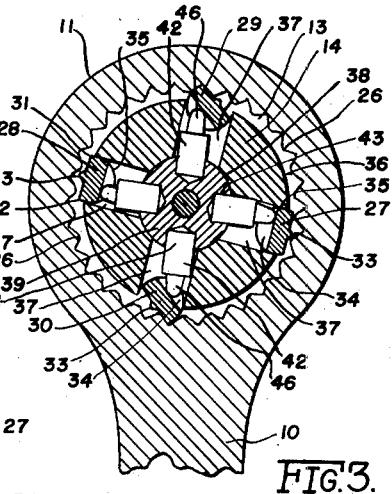
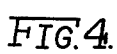
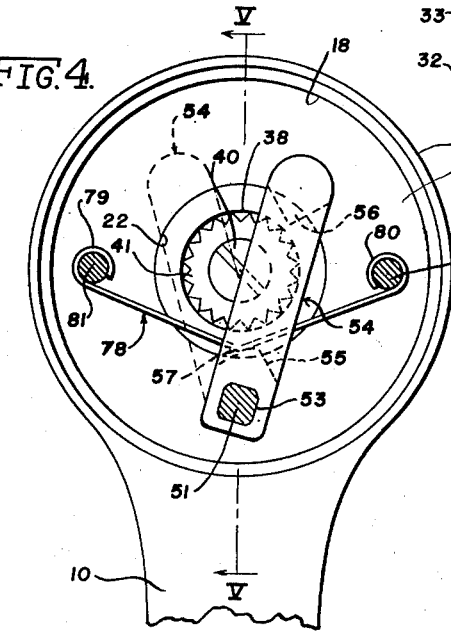
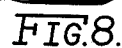
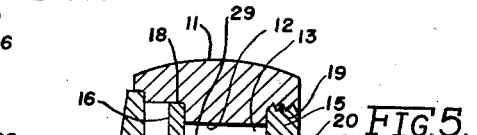
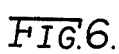
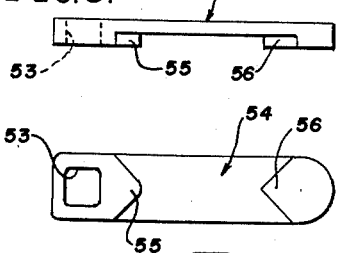
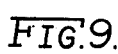
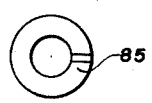
INVENTORS.
GEORGE M. WALRAVEN.
RAYMOND G. KNUDSEN.
BY
ATTORNEY.

Patented Jan. 29, 1952

2,583,617

UNITED STATES PATENT OFFICE 2,583,617

RATCHET CONTROL MECHANISM

George M. Walraven and Raymond G. Knudsen, Kenosha, Wis., assignors to Snap-On Tools Corporation, Kenosha, Wis., a corporation of Delaware Application March 23, 1946, Serial No. 656,550

11 Claims. (Cl. 192—43.2)

This invention relates to ratchet mechanisms and more particularly to reversible ratchet pawl controls therefor, although certain features thereof may be employed with equal advantage for other purposes.

It contemplates more especially the provision of an improved pawl control for ratchet devices of the reversible type such as described in United States Letters Patent No. 2,020,883 issued November 12, 1935, which is capable of instantaneous adjustment to enable reversal without withdrawal or change in position of its application for nut turning or other purposes.

It is desirable to preset and retain the pawls of ratchet mechanisms against accidental displacement in that these devices are utilized in restricted and non-accessible nut turning positions. Consequently, any accidental displacement of the pawls necessitates the withdrawal of the tool and the re-adjustment of the pawl or pawls. This entails a great deal of time and labor which can be avoided by providing a positive pawl control lock which precludes any accidental displacement of the pawl mechanism.

The present invention improves the pawl adjusting structure, renders the operation more dependable, and precludes the displacement of the pawl mechanism from its preset position. This is an important factor in ratchet mechanism owing to the fact that they are often employed in restricted locations where their manipulation is difficult and accessibility is restricted. The instant invention provides a more dependable ratchet mechanism that insures the desired directional operation thereof for which it has been set without any possibility of being self-changing through impact or accidental manipulation.

One object of the present invention is to simplify the construction and improve the operation of ratchet pawl shifting and locking devices of the character mentioned.

Another object is to provide a combined pawl shifting and locking mechanism that afford presetting of pawl mechanism and the locking thereof against accidental shifting.

Still another object is to provide a compact ratchet mechanism having a unitary adjustment for a plurality of reversible sets of pawls which affords shifting and the self-locking thereof against accidental displacement.

A further object is the provision of a ratchet having a unitary exteriorly accessible adjusting and self-locking pawl shifter to control the ratcheting direction of a plurality of opposite sets of pawls.

A still further object is to provide a simple and compact reversible ratchet pawl shifting and self-locking mechanism for selected directional ratcheting rotation control.

Still a further object is to provide a pawl shifter that is self-locking when it is in a preset position.

Other objects and advantages will appear from the following description of an illustrative embodiment of the present invention.

In the drawing:

Figure 1 is a fragmentary top plan view of a device embodying features of the present invention.

Figure 2 is a fragmentary side view in elevation of the device shown in Figure 1.

Figure 3 is a fragmentary sectional view taken substantially along the line III—III of Figure 2.

Figure 4 is an enlarged fragmentary sectional view taken substantially along irregular line IV—IV of Figure 2.

Figure 5 is a fragmentary sectional view taken substantially along line V—V of Figures 1 and 4.

Figure 6 is an enlarged detail top plan view of the pawl shifting and locking lever.

Figure 7 is a side view in elevation of the pawl shifting and locking lever shown in Figure 6.

Figure 8 is a perspective view of a pawl of the type shown in assembled position in Figure 3.

Figure 9 is a plan view of the friction or lock washer for retaining the pawl in adjusted position.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises an elongated shank 10, in this instance, of substantially elliptical cross-section, which terminates in a circular or cylindrical head member 11 at one end and a handle member (not shown) at the other end.

The head member 11 is suitably recessed as at 12 to define a circular chamber 13 open on both sides for the reception of a loosely fitting revoluble member 14 therein. The member 14 serves as a pawl carrier and is retained within the chamber 13 of the head 11 by means of a pair of confronting face plates 15 and 16 which conform in contour with shouldered annular peripheries 17 and 18 defining the end openings in the circular head 11 to enable access to the chambered interior 13.

While the face plates 15 and 16 substantially conform in contour with the openings 17 and 18 of the head 11, the lower face plate 15 is threaded as at 19 to engage the correspondingly threaded annular periphery 17. The upper face plate 16 is somewhat larger to enable the pressed application for telescopic reception in frictional engagement with the chamber end peripheral shoulder 18 presenting an obstruction against which the plates 15 is pressed to preclude accidental removal of the revoluble member 14. Diametrically spaced recesses 20 are provided in the outer face of the lower plate 15 for engagement by a spanner wrench of standard construction to tighten and loosen the lower face plate 15. This affords access to the interior of the chamber 13 by removal of the lower face plate 15.

The confronting surfaces of the face plates 15 and 16 are axially apertured to provide aligned bores 21 and 22 in communication with the interior of the chamber 13, the bore 21 rotatively receiving the corresponding shaped and somewhat smaller sized hub 23 provided on one end of the revoluble member 14 journalled therein. As shown, the revoluble member 14 terminates downwardly in an axially extending socket engaging shank 24 which preferably is provided with a spring impelled detent 25 for frictionally receiving and retaining a standard nut turning socket (not shown) in detachable association therewith.

To enable racheting of the revoluble member 14 in opposed directions by selective adjustment, the interior periphery of the circular head 11 is provided with a circumferential series of radially extending ratchet teeth 26 cut or otherwise formed for inward radial extension within the head chamber 13 to present engagement with a plurality of diametrically opposite sets of pawls 27—28 and 29—30, in this instance two sets, as will appear more fully hereinafter.

As shown, each of the pawls 27—28—29—30 have oppositely directed or diverging teeth 31 and 32 with an intermediate rib or projection 33 of curved contour to confront the extremities of the ratchet teeth 26 and to contact the teeth 26 so as to serve as a fulcrum for pivoting the pawls 27—28—29—30 so that the pawl teeth 31 and 32 engage between adjacent ratchet teeth 26 depending upon the desired directional ratcheting for nut turning or other ratcheting operations.

The remaining surface 34 of the pawls 27—38—29—30 is circular or cylindrical within a common circumference so as to serve as a complement of a plurality of semi-circular grooves or recesses 35, in this instance four, equidistantly spaced along and extending transversely through the peripheral circumference 36 of the revoluble member 14 which serves as a pawl carrier. The circular grooves or recesses 35 communicate with diametrical bores 37, in this instance four, which extend radially through the axis of the revoluble member 14. The diametrical bores 37 communicate with an axial bore 38 provided in the revoluble member 14. The axial bore 38 in the revoluble member 14 is closed on all sides except one end thereof to receive a pawl adjusting axial member 39 having a threaded stud 40 axially attached thereto to retain a serrated wheel 41 thereon for rotation therewith to effect the directional displacement of the opposite sets of pawls 27—28 and 29—30 which, in turn, control the directional intermittent rotation of the revoluble member or pawl carrier 14.

The pawl teeth 31 and 32 on each of the pawls 27—28—29—30 are sufficiently spaced to enable the desired rotary throw of the head 11 for ratcheting purposes without interference with the inactive pawl tooth, thereby partially rotating the pawls 27—28—29—30 about their curved confronting surface 34 responsive thereto until the next opposite ratchet teeth 26 in registry therewith are engaged by both pawls 27—28 or 29—30. It should be noted that while one set of pawls 28—29 are in operative engagement with ratchet teeth 26, the other set of pawls 30—31 are inoperatively disposed in neutral position on the nodes of the ratchet teeth 26, thereby affording shorter ratcheting strokes which is desirable in restricted locations.

To maintain the pawls 27—28 and 29—30 stationary and in adjusted positions for the desired directional ratcheting, a plurality of tubular sleeves 42, in this instance four, radially project from a transverse radial recess 43 provided in the pawl adjusting shank 39. The sleeves 42 project from the pawl adjusting shank 37 into the appreciably larger diametrical bore 35 in the revoluble member 14 to extend within the range of and align with cross slots 44 disposed transversely through the center of the pawls 27—28—29—30 intermediate the ends thereof (Figure 3).

Pin or other types of detents 45 are reciprocally mounted within the open free end of the sleeve 42 so that the tapered pin extremities 46 will contact with the bottom of the pawl slots 44. The tapered pin extremities 46 of the detents or pins 45 contact or engage the bottom of the pawl slots 44 on either side of their center line which is in confronting relation with the tooth fulcrum 33 intermediate the pawl teeth 29—30, thereby holding or tending to hold one set of the ratchet engaging pawls 29—30 in an inclined position (Figure 3) while the other set of opposite pawls 27—28 disposed between ratchet teeth 26 are out of engagement in a tangentially central position so that one of their respective teeth 29 or 30 are in engagement with diametrically opposite ratchet teeth 26, this urge being imparted by means of coiled springs 47 which are confined within the sleeves 42 between the pins 45 so as to normally urge the latter outwardly in the direction of the pawls 27—28—29—30. The pawls 27—28—29—30 are urged outwardly against the ratchet teeth 26 so that the former fulcrum about their intermediate ridge 33 when rotatively shifted in the circular seats 35 of the pawl carrier 14.

It is to be noted that the pawls 27—28—29—30 are freely rotatable in their circular seats 35 provided in the pawl carrier 14 for controlled operation by the directional actuator such as an exteriorly accessible finger manipulating lever 48. The lever 48 has an enlarged extremity 49 through which a polygonal bore 50 extends to receive a complemental pin 51 that has a reduced extremity 52 journalled in the confronting face plate 16 (Figure 5). The polygonal pin 51 projects through a complemental bore 53 provided in the lower extremity of an elongated actuator bar 54 (Figure 4) that cooperates with the toothed pawl control wheel 41. To this end, the actuator bar 54 has upraised confronting pointed teeth 55—56 spaced from each other for distance somewhat greater than the diameter of the toothed control wheel 41.

The end tooth 56 of the actuator bar 54 is disposed in the path of the peripheral teeth of the wheel 41 for engagement therewith only when the opposed pawl actuator bar tooth 55 is displaced along an arcuate path defined by the pivot pin 51 of the actuator lever 48 to confront the node 57 of an angularly shaped flat spring 78. The angularly shaped flat spring 78 is anchored at its arcuate extremities 79—80 to diametrically spaced fastener studs 81—82 which project through a cover plate 83 for retention thereof in the outer peripheral circular seat 84 of the ratchet head 11. Consequently, the node 57 keeps the actuator bar 54 in one or the other of two opposite inclined positions as shown in full and dotted outline in Figure 4. In either of these extreme opposite inclined positions, the actuator tooth 56 is out of engagement with the toothed wheel 41.

However, in displacing the lever 48 from one to the other of these opposite positions, the actuator tooth 56 will engage the toothed wheel 41 during its intermediate sweep to turn the wheel 41 and the pawl actuator member 39 in one or the other of its opposite extreme positions for reversing the directional ratcheting movement and operation of the ratchet head 11. In order to guide the adjustment of the pawls 27—28 and 29—30 for the desired directional ratcheting, designating indicia 84, in this instance "on" and "off" indicators are impressed in the top exterior surface of the cover plate 83 (Figure 1).

Movement of the actuator lever 48 in a clockwise direction indicated by the directional indicator "off" (viewed from Figure 1) will cause the pawl teeth 32 of the operative set of pawls 29—30 to engage the ratchet teeth 26 for rotating the revoluble member 14 in an opposite or counter-clockwise direction (viewed from Figures 1 and 3) to loosen or turn a nut off of the right handed threaded member. Opposite adjustment indicated by the directional indicator "on" places the pawl teeth 31 in engagement with the ratchet teeth 26 for the rotating revoluble member 14 in a clockwise direction (viewed from Figures 1 and 3) to tighten or turn a nut on a right handed threaded member or for other ratcheting purposes.

In other words, the diametrically opposite pawls 27—28 and 29—30 are disposed with their pawl teeth 31 or 32 engaging the ratchet teeth 26 to rotate the socket engaging shank 24 in a clockwise or counter-clockwise direction (viewed from Figure 1) for turning nuts on and off or for other ratcheting purposes depending upon whether or not the pawl teeth 31 or 32 engage the ratchet teeth 26. The position of the pawls 27—28 and 29—30 may be reversed by rotating the pawl actuator lever 48 to its opposite extreme rotary position to reverse their directional position for ratcheting purposes in one or the other of these two directions.

To the end of precluding the accidental shifting of the central pawl position adjusting or actuating member 39 during the operative employment of the ratcheting mechanism in restricted and comparatively non-accessible places, and to allow the pawl adjusting control wheel 41 to rotate to a larger degree than the pawl adjusting or actuating member 39, a split resilient friction washer 85 (Figure 9) is interposed between the toothed pawl adjusting control wheel 41 and the pawl adjusting or actuating member 39 to surround the axial threaded wheel retainer stud 40. This friction lock washer 85 serves as a friction clutch to permit the actuator bar pawl or tooth 56 to clear the toothed control wheel 41 so that the latter can revolve with the revoluble member 14 even though the angular adjustment of the pawl adjusting or actuating member 39 is not sufficient to allow the actuator bar tooth 54 to clear the toothed control wheel 41.

Consequently, the actuating lever 48 will either be free for pawl positioning within the attendant's control or it will be locked against accidental shifting in one or the other of its extreme operative positions 84 to determine the directional ratcheting action, serve as a pawl indexing expedient, and preclude accidental displacement from the indexed position even under conditions of impact and abrasion with any of the moving parts. These simple shifting and self-locking expedients insure the maintenance of the pre-adjusted position for the desired directional ratcheting.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. In a ratchet mechanism, the combination with a handle, of a head associated with said handle, a revolvable member journalled in said head, cooperating pawls and ratchet teeth in said revolvable member and head, a pawl adjusting lever actuator journalled for rotary movement relative to and past said revolvable member for momentary engagement therewith, position indexing means on said head for cooperation by said pawl adjusting lever actuator, means extending radially on said actuator lever opposite to said indexing means for adjusting the angular position of said pawls relative to said ratchet teeth to regulate the direction of ratcheting, and spring means for normally retaining said pawl adjusting lever actuator free from engagement with said revolvable member in any adjusted position.

2. In a ratchet mechanism, the combination with a handle, of a head associated with said handle, a revolvable member journalled in said head so that the periphery thereof confronts said ratchet teeth, cooperating pawls and ratchet teeth in said revolvable member and head, a shiftable actuator journalled for rotation relative to and past said revolvable member for momentary engagement therewith to regulate the position of said pawls relative to said ratchet teeth to control the direction of ratcheting said head responsive to oscillating said handle, means on said actuator for cooperation with said revolvable member for shifting the angular position of said pawls relative to said teeth to regulate the direction of ratcheting of said revolvable member, and means in the path of said shiftable actuator to effect self-locking thereof free from engagement with said revolvable member in any adjusted position.

3. In a device of the character described, the combination with reversible pawl and ratchet means, of pawl adjusting means mounted for movement in the path of said reversible pawl means for momentary engagement therewith and means operatively associated with said pawl adjusting means for indexing the operative positions of said reversible pawl means and to retain the latter free from engagement with said reversible pawl means.

4. In a device of the character described, the combination with reversible pawl and ratchet means, of pawl adjusting means mounted for movement in the path of said reversible pawl means for momentary engagement therewith, means operatively associated with said pawl adjusting means for indexing the operative positions of said reversible pawl means and to retain the latter free from engagement with said reversible pawl means, and means for normally maintaining said pawl adjusting means inoperative relative to said reversible pawl means and operative relative to said indexing means.

5. In device of the character described, the combination with reversible pawl and ratchet means, of pawl adjusting means mounted for movement in the path of said reversible pawl means for momentary engagement therewith, means operatively associated with said pawl adjusting means for indexing the operative positions of said reversible pawl means and to retain the latter free from engagement with said reversible pawl means, and spring means for normally maintaining said pawl adjusting means inoperative relative to said reversible pawl means and operative relative to said indexing means, said spring means being associated with said pawl adjusting means to frictionally retain the latter against displacement when disengaged from said reversible pawl means.

6. In a ratchet mechanism, the combination with a pawl carrier, of reversible pawl and ratchet means in said carrier, means for shifting the position of said reversible pawl means to control the direction of ratcheting, a lever mounted for movement in the path of said pawl shifting means for operative connection therewith in one position to displace said pawl shifting means and inoperative association therewith in another position to index the position thereof, and flat spring indexing means for maintaining said lever in its adjusted positions free from engagement with said reversible pawl means to preclude accidental displacement of said pawl shifting means.

7. In a ratchet mechanism, the combination with a pawl carrier, of reversible pawl and ratchet means in said carrier, means for shifting the position of said reversible pawl means to control the direction of ratcheting, said pawl shifting means having a toothed shank, an adjustable lever capable of meshing engagement with said toothed shank of said shifting means in one position of adjustment, and an angular flat spring operatively associated with said lever means for maintaining the latter in adjusted extreme positions disengaged from said toothed shank of said shifting means.

8. In a ratchet mechanism, the combination with a pawl carrier, of reversible pawl and ratchet means in said carrier, means for shifting the position of said reversible pawl means to control the direction of ratcheting, said pawl shifting means having a toothed shank, an adjustable lever capable of meshing engagement with said toothed shank of said shifting means in one position of adjustment, an angular flat spring operatively associated with said lever means for maintaining the latter in adjusted extreme positions disengaged from said toothed shank, said lever having confronting teeth for engagement with said toothed shank and flat spring for the purposes set forth.

9. In a ratcheting mechanism, the combination with a body member, said body member including a head member, a revolvable member journalled in said head member, there being a circumferential series of ratcheting teeth in said head, a lesser number of circumferentially spaced pawls in said revolvable member to confront said ratcheting teeth, certain of said pawls comprising sets disposed for engagement with said ratcheting teeth for turning the revolvable member in opposite direction depending upon the position of said pawls, other of said pawls comprising sets disposed intermediate said ratcheting teeth to cooperate with said first named set of pawls for shortening the ratcheting stroke of said body member, a cylindrical actuator member journalled in said revolvable member, there being radially aligned bores extending through said revolvable and actuator member, sleeves in said actuator bores to freely extend into said revolvable member bores that are sufficiently large to permit movement of said actuator sleeves in a circular path relative to said revolvable member, pins reciprocally mounted in said actuator sleeves, springs in said actuator sleeves to normally urge said pins outwardly for engagement with said pawls to displace all of said pawls relative to said ratcheting teeth to control the direction of ratcheting said revolvable member relative to said ratchet head member, manual means for shifting said pawl actuator member, and spring means for retaining said manual means in its shifted position.

10. In a ratchet mechanism, the combination with a handle of a head member associated with said handle, a revolvable member journalled in said head member, there being a circumferential series of ratcheting teeth in said head member, a lesser number of circumferentially spaced pawls in said revolvable member to confront said ratcheting teeth, certain of said pawls comprising sets disposed for engagement with said ratcheting teeth for turning the revolvable member in one direction, other of said pawls comprising sets disposed intermediate said ratcheting teeth, a cylindrical actuator member journalled in said revolvable member, there being radially aligned bores extending through said revolvable and actuator members, sleeves pressed into said actuator bores to freely extend into said revolvable member bores that are sufficiently large to permit movement of said actuator sleeves in a circular path relative to said revolvable member, pins reciprocally mounted in said actuator sleeves, and springs in said actuator sleeves, said pins having their inward ends recessed to receive said springs so that the latter may be sufficiently long to impart the required force to normally urge said pins outwardly for engagement with said pawls to displace all of said pawls relative to said ratcheting teeth to control the direction of ratcheting said revolvable member relative to said wrench head member.

11. In a ratchet mechanism, the combination with a handle, of a head member associated with said handle, a revolvable member journalled in said head member, there being a circumferential series of ratcheting teeth in said head member, a lesser number of circumferentially spaced pawls in said revolvable member to confront said ratcheting teeth, certain of said pawls comprising sets disposed for engagement with said ratcheting teeth for turning the revolvable member in one direction, other of said pawls comprising sets disposed intermediate said ratcheting teeth, a cylindrical actuator member journalled in said revolvable member, there being radially aligned bores extending through said revolvable and actuator members, sleeves pressed into said actuator bores to freely extend into said revolvable member bores that are sufficiently large to permit movement of said actuator sleeves in a circular path relative to said revolvable member, pins reciprocally mounted in said actuator sleeves, springs in said actuator sleeves, said pins having their inward ends recessed to receive said springs so that the latter may be sufficiently long to impart the required force to normally urge said pins outwardly for engagement with said pawls to displace all of said pawls relative to said ratcheting teeth to control the direction of ratcheting said revolvable member relative to said wrench head member, and axially projecting means fixed to said actuator member to enable the manual rotary displacement thereof relative to said revolvable member to adjust the ratcheting direction of said pawls.

GEORGE M. WALRAVEN.
RAYMOND G. KNUDSEN.

REFERENCES CITED

The following references are of record in the file of this patent:

UNITED STATES PATENTS

| Number | Name | Date |
|---|---|---|
| 527,181 | Nelson | Oct. 9, 1894 |
| 2,020,883 | Gayne | Nov. 12, 1935 |
| 2,143,121 | Cox | Jan. 10, 1939 |
| 2,188,846 | Rueb | Jan. 30, 1940 |
| 2,202,402 | Rueb | May 28, 1940 |